(12) United States Patent
Durant et al.

(10) Patent No.: US 8,148,284 B2
(45) Date of Patent: Apr. 3, 2012

(54) INJECTION OF LIQUID SORBENT CONDITIONING INTO A SORBENT TRANSPORTING PASSAGEWAY

(75) Inventors: James F. Durant, Windsor, CT (US); David J. Matteson, Avon, CT (US); Kurt W. Johnson, Canton, CT (US)

(73) Assignee: ALSTOM Technology Ltd, Baden (CH)

( * ) Notice: Subject to any disclaimer, the term of this patent is extended or adjusted under 35 U.S.C. 154(b) by 798 days.

(21) Appl. No.: 12/028,991

(22) Filed: Feb. 11, 2008

(65) Prior Publication Data

US 2009/0199919 A1 Aug. 13, 2009

(51) Int. Cl.
*B01D 15/00* (2006.01)

(52) U.S. Cl. ............... 502/22; 502/25; 502/29; 502/30; 502/31

(58) Field of Classification Search .............. 502/22, 502/25–33; 134/2, 10, 22.1, 22.11, 22.12, 134/22.13, 22.14, 22.19, 32, 26, 30, 34, 36, 134/129, 131; 427/212, 215, 424, 444, 421.1, 427/425

See application file for complete search history.

(56) References Cited

U.S. PATENT DOCUMENTS

| | | | | |
|---|---|---|---|---|
| 1,356,049 A * | 10/1920 | Dibert | ............. | 99/518 |
| 1,488,805 A * | 4/1924 | Chappell et al. | ............. | 502/27 |
| 2,236,679 A * | 4/1941 | Ferguson et al. | ............. | 502/27 |
| 2,951,036 A * | 8/1960 | Bodkin et al. | ............. | 208/305 |
| 3,072,567 A * | 1/1963 | Evans et al. | ............. | 208/304 |
| 3,261,368 A * | 7/1966 | Owens et al. | ............. | 134/104.1 |
| 3,274,104 A * | 9/1966 | Hamilton | ............. | 210/674 |
| 3,720,626 A * | 3/1973 | Benzaria et al. | ............. | 502/25 |
| 4,235,708 A * | 11/1980 | Moudgil et al. | ............. | 209/3.3 |
| 4,686,198 A * | 8/1987 | Bush et al. | ............. | 502/25 |
| 4,943,376 A * | 7/1990 | Scamehorn et al. | ............. | 210/674 |
| 6,312,528 B1 * | 11/2001 | Summerfield et al. | ............. | 134/40 |
| 6,594,553 B1 | 7/2003 | Johnson et al. | | |
| 2001/0008617 A1 * | 7/2001 | Robles | ............. | 423/22 |

FOREIGN PATENT DOCUMENTS

| | | | |
|---|---|---|---|
| EP | 611071 | * | 8/1994 |
| JP | 54-161162 | * | 12/1979 |
| JP | 56-130228 | * | 10/1981 |
| WO | 94/26409 | * | 11/1994 |

* cited by examiner

*Primary Examiner* — Steven Bos
(74) *Attorney, Agent, or Firm* — Robert D. Crawford

(57) ABSTRACT

A system for effecting the pretreatment therewith of a sorbent comprising a conveying line (105), such as a pipe, and a plurality of solution nozzles operative for purposes of introducing a solution to treat the sorbent. More particularly, the conveying line (105) includes an inlet (107), an outlet (109), and an inner surface (105a) that is operative to define a passageway (190) through which sorbent particles are capable of being transported between the inlet (107) of the conveying line (105) and the outlet (109) of the conveying line (105). Each of the plurality of solution nozzles includes a respective one of a plurality of orifices (120) that are designed to be disposed circumferentially about the inner surface (105a) of the conveying line (105) and that are designed to be operative to effect therewith the injection of an aqueous solution of a liquid sorbent conditioner into the passageway (190) in order to thereby effect therewith the pretreatment of sorbent particles that are being transported through the passageway (190) in the conveying line (105).

10 Claims, 9 Drawing Sheets

US 8,148,284 B2

INJECTION OF LIQUID SORBENT CONDITIONING INTO A SORBENT TRANSPORTING PASSAGEWAY

RELATED APPLICATION

This application is related to U.S. application Ser. No. 09/552,183, filed Apr. 18, 2000 and entitled "Process for enhancing the sulfur capture capability of an alkaline earth material", which issued as U.S. Pat. No. 6,594,553, on Jul. 15, 2003, and the disclosure of which is incorporated herein in its entirety by this reference thereto.

FIELD OF THE INVENTION

The present invention relates generally to the pretreatment of sorbent, and more specifically, to the pretreatment of sorbent that is being transported through a passageway. The present invention is particularly suited for the pretreatment of limestone that is being transported in a pneumatic transport pipe to a fluidized bed type fossil fuel fired heat generating system in order to thereby enhance the capture of the sulfur that is present in sulfur dioxide ($SO_2$) laden flue gas, which is created during the operation of such a system, so as to thereby reduce the amount of airborne emissions of sulfur.

BACKGROUND OF THE INVENTION

Heat generating systems that utilize furnaces for purposes of firing fossil fuels have long been employed to produce controlled heat, with the objective of performing useful work therewith. Such work might be in the form of direct work, as with kilns, or might be in the form of indirect work, as with steam generators capable of being utilized in industrial or marine applications or for purposes of driving turbines that are capable of being utilized in order to produce electric power. During the course of such a combustion process, the sulfur in the fuel becomes oxidized to thereby form sodium dioxide ($SO_2$), which becomes entrained in the flue gas that is exhausted from the furnace.

Modern water-tube furnaces suitable for use for steam generation purposes can be of various types including, by way of exemplification and not limitation, central-station steam generators, industrial boilers, fluidized-bed boilers, and marine boilers. In accordance with the mode of operation of circulating fluidized-bed type boilers, a gas is made to flow through a bed of solid particles, said bed of solid particles including a crushed solid fuel, such that the flow of gas therethrough produces forces that tend to separate the solid particles in the bed from one another. Moreover, as the gas flow is increased, a point is reached at which the forces on the solid particles in the bed are just sufficient enough to cause the separation of the solid particles in the bed from one another. When such a point is reached the bed then becomes fluidized, that is, the gas that is between the solid particles permits the solid particles to move freely, thereby giving the bed a liquid-like character. Such a circulating fluid bed is further characterized by the very high solids-mixing rates that are capable of being realized therewith. At higher velocities and with the finer size of the solid particles in the bed, the surface of the fluid bed becomes diffuse asentrainment of the solid particles in the bed increases, such that no longer is the surface of the bed defined. Furthermore, recycling of entrained material to the bed, i.e., from the bed to the combustor and from the combustor to the particle recycle system and then once again back to the bed, is required at high rates in order to thereby maintain the inventory of the solid particles in the bed. Continuing, it is to be noted that the bulk density of the solid particles in the bed will decrease as the height of the combustor increases.

In addition to the crushed solid fuel, such as, by way of exemplification, the finely crushed coal particles to which reference has been had hereinbefore previously, the fluidized bed also typically includes crushed sorbent particles, such as particles of an alkaline earth material, e.g., limestone or dolomite particles, suitable for use for purposes of effecting therewith the capture of sulfur from the $SO_2$ that becomes entrained in the flue gases that are produced during the combustion of the crushed solid fuel, so as to thereby reduce the amount of the airborne sulfur emissions present in the flue gas, which ultimately is directed to the stack. The fluidized bed may also include other solids, such as, for example, unburnt materials, which are entrained in the flue gas that is produced during the combustion of the crushed solid fuel and that is thereafter recycled back to the fluidized bed. During the combustion that occurs in the combustor of the fluidized-bed boiler, both solid fuel particles and sorbent particles are consumed. Thus, the fluidized bed of the fluidized-bed boiler must continuously be replenished with fresh crushed solid fuel particles and fresh sorbent particles. In addition, said fluidized bed may also be replenished with recycled sorbent particles that are extracted from the flue gas that is produced during combustion and that is then recycled to the fluidized bed.

U.S. Pat. No. 6,594,553, which is also assigned to the same assignee to which all of the rights in the present invention are assigned, and which has inventorship that overlaps with the inventorship of the present application, discloses that by pre-treating, i.e., coating, finely crushed limestone particles with an aqueous treatment solution, such as, by way of exemplification and not limitation, an aqueous solution, which includes an inorganic salt, wherein the pre-treatment occurs prior to the introduction of such finely crushed limestone particles into the combustor of the fluidized-bed boiler, the capture of the sulfur from the $SO_2$, which is entrained within the flue gas that is produced during combustion can be enhanced, and, therefore, concomitantly the consumption of sorbent and/or the amount of airborne sulfur emissions can be reduced as a consequence thereof. As disclosed in U.S. Pat. No. 6,594,553, the inorganic salt may be a thermally decomposable sodium compound, such as, by way of exemplification, sodium carbonate, sodium bicarbonate, sodium hydroxide, sodium nitrate, or sodium acetate sodium hydroxide. In U.S. Pat. No. 6,594,553, it is also pointed out that it is deemed to be desirable to pre-treat the crushed sorbent particles by injecting the aqueous treatment solution into the pneumatic transport piping by means of which the sorbent particles are conveyed from a suitable storage site to the fluidized-bed boiler. This appears to be attributable to the fact that this facilitates the real time adjustment of the rate and the amount of pre-treatment that takes place as a function of both the feed rate of the sorbent and the amount of $SO_2$ that is entrained in the flue gas. In the industry to which the present invention is applicable the process of coating a sorbent with an aqueous treatment solution is commonly referred to as "wetting". While U.S. Pat. No. 6,594,553 does not contain any description and/or illustration of an injector that would be suitable for purposes of effecting therewith the injection of such an the aqueous treatment solution, various types of injectors, which are known to those skilled in this art could be used without departing from the essence of the present invention to effect therewith the injection of an aqueous treatment solution, of the types to which reference has been had hereinbefore previously, into the pneumatic transport piping through which the sorbent is conveyed so as to thereby cause the sorbent to be treated.

However, it has been found in the course of experimentation with known injection techniques that, while an atomized aqueous treatment solution can be injected into a pneumatic transport piping through which sorbent is being conveyed in a manner so as to thereby facilitate the proper treatment, i.e., the proper "wetting out" of the sorbent being so conveyed, such an injection can also result in the formation of deposits of the injected materials on to the inner wall surface of the pneumatic transport piping. Such formations of deposits in turn can result in the localized agglomeration of the sorbent particles and ultimately result in the formation of "mortar like" nodules or deposits that become firmly attached to the inner wall of the pneumatic transport piping at a point located downstream of the point at which the injector is located from which the atomized aqueous treatment solution is injected into the pneumatic transport piping. The presence of such mortar like nodules or deposits is operative to produce a pressure drop across the pneumatic transport piping and eventually can result in line plugging.

Accordingly, a need has been found to exist in the prior art for a new and improved injection technique for effecting therewith the injection of an aqueous treatment solution into pneumatic transport piping in which a sorbent is being conveyed in a manner so as to thereby facilitate the proper treatment of the sorbent particles and concomitantly that is also operative to at least reduce the risk that deposits of the injected materials will be formed on the inner wall surface of the pneumatic transport piping when compared to the formation of such deposits when conventional techniques are employed.

The difficulty in achieving the wetting of finely divided dry solid particles with small amounts of liquid so as to provide a uniform surface coating thereon is well known to those skilled in the art. To this end, a number of different formulation studies, for example, have been performed with respect to coal water slurries in order to thereby determine the best way of "wetting out" pulverized coal particles so that they can thereby be dispersed into the water phase. Accomplishing this "wetting out" process is also a challenge in coating pneumatically transported limestone particles with a sodium containing solution while yet maintaining good transport properties.

Powders with good transport properties are known to have a high permeability. That is, to this end the air that is being employed for transport purposes readily percolates through the powder to assist the movement of the powder in the conveying line, e.g., the pneumatic transport piping. Continuing, powders that have a high permeability are known to be readily transportable in conventional pneumatic systems. However, the flow of air in powders that have a low permeability have the tendency to result in the compacting of the material, which in turn results in an increased pressure drop in the conveying line, as well as an increased potential for the conveying line to become plugged. Typically, pulverized limestone and coal, in dry form, exhibit good air permeability and are readily transportable in pneumatic systems. While in the case of fluidized bed type systems, it is known that changes in the transport piping pressure are generally caused by increases or decreases in the amount of the solid powders being transported, and that it is also possible for such pressure changes to be caused by changes in the surface characteristics of the powders that are being conveyed. For example, increasing the moisture content of the powder by less than 1% can result in the permeability of the flowing limestone powder being reduced such as to thereby result in the occurrence of a pressure drop and/or the occurrence of line plugging. In FIG. 9 of the drawings there is illustrated a graph of the effect that increasing the amount of dry limestone that is being conveyed has on the pressure drop of the transport piping.

In the sorbent enhancement of powdered limestone, it is known that the enhancing liquid needs to be well mixed with the pulverized limestone. Furthermore, such mixing generally must occur in less than one second, since this is the period of time that is normally available between the time at point in the flow at which the enhancement liquid is introduced to the pulverized limestone and the time at the point at which the mixture is discharged into the boiler. As will be recognized by those skilled in the art, the rate of mixing is, to a large extent, controlled by the degree of contact between the enhancement liquid and the pulverized limestone, and how quickly the surface of the pulverized limestone particles becomes coated, i.e., is wetted, by the enhancement liquid.

Typically, particles of pulverized limestone are conveyed in a loose agglomerated form, wherein such particles of pulverized limestone are joined together along their crystal faces, edges, and/or corners, thereby resulting in the existence of loose and open structures. Such types of structures possess a large amount of surface area which, depending on the implementation, may need to be wetted-out by a relatively small amount of enhancement liquid. In such a wetting out process, the solid-air interface, which exists in the conveying line prior to the introduction of the enhancing liquid thereinto, is replaced by a solid-liquid interface after the enhancement liquid is introduced into the conveying line. For complete wetting, however, it is necessary to effect the replacement of all of the absorbed air on both the external and internal surfaces of the pulverized limestone particles with the enhancement liquid. To this end, fast, effective wetting-out of the limestone will assist in minimizing any negative changes in the air permeability thereof and in the pneumatic transport properties of the limestone.

Accordingly, a need has been found to also exist in the prior art for a new and improved technique for quickly and effectively effecting therewith the wetting-out of limestone particles in order to thereby minimize any negative changes in the air permeability thereof and in the pneumatic transport properties of the limestone.

OBJECTS OF THE INVENTION

Accordingly, it is an objective of the present invention to provide an improved technique for purposes of effecting the injection of an aqueous treatment solution, such as, by way of exemplification, a thermally decomposable sodium compound, into pneumatic transport piping in which a sorbent is being conveyed, such as, by way of exemplification, limestone or dolomite particles.

It is also an objective of the present invention to provide an improved technique that is operable for purposes of facilitating the wetting out of sorbent particles, such as, by way of exemplification, limestone or dolomite particles, by means of an aqueous treatment solution that is injected into the pneumatic transport piping in which the sorbent is being conveyed.

Additional objects, advantages, and novel features of the present invention will become apparent to those skilled in this art from this disclosure, including the following detailed description and the illustration in the drawings, as well as by practice of the present invention. While the present invention is described below with reference to a preferred embodiment(s), it should be understood that the present invention is not limited thereto. To this end, those of ordinary skill in this art having access to the teachings herein will recognize additional implementations, modifications, and embodiments of the present invention, as well as other fields of use of the present invention, which are within the scope of the present invention as the latter is disclosed, illustrated and claimed herein and with respect to which the present invention could be of significant utility.

SUMMARY OF THE INVENTION

In accordance with the present invention, a technique is provided for effecting therewith the pretreatment of a sorbent, such as, by way of exemplification, limestone or dolomite. To this end, a preferred embodiment of the system with which such technique is employed includes both a conveying line, which commonly is most often in the form of a pipe, and a plurality of nozzles operative for purposes of injecting a solution therewith. Said conveying line includes an inlet for supplying sorbent thereto, said inlet being located at a point that is upstream along the conveying line, as well as an outlet, said outlet being located at a point that is downstream along the conveying line, and an inner surface that is designed to define a passageway through which sorbent particles are capable of being transported, typically by means of pressurized air, between said inlet of the conveying line and said outlet of the conveying line. The conveying line, by way of exemplification and not limitation, may, for example, consist of a pneumatic transport pipe, which is operative for purposes of conveying sorbent therethrough to a fossil fuel boiler, such as, by way of exemplification, a circulating fluidized bed type fossil fuel boiler. Each of the plurality of nozzles that are operative to inject solution therethrough includes a respective one of a plurality of orifices that are designed to be disposed circumferentially about the inner surface of the conveying line and from which an aqueous treatment solution is capable of being injected into the passageway that is defined in the conveying line in order to thereby pre-treat the sorbent particles that are being transported through the passageway that is defined in the conveying line. Each one of the plurality of nozzles preferably is in the form of a compound nozzle of conventional construction, which is designed to be operative for purposes of effecting therewith the atomization of the solution that is being employed for aqueous treatment purposes by virtue of said solution being directed so as to penetrate a pressurized air flow prior to said solution being injected through the orifice of the compound nozzle of conventional construction into the passageway that is defined in the conveying line.

In accordance with a preferred embodiment of the present invention, each of the plurality of orifices of the plurality of nozzles is suitably configured in order to thereby be operative to effect therewith the injection of the solution that is being employed for aqueous treatment purposes into the passageway that is defined in the conveying line in a manner such as to be substantially flush with the inner surface of the conveying line, e.g., the latter, by way of exemplification, comprising a pipe, at a location that is proximate to the respective one of the orifices. That is, the nature of such orifice is such that the solution is designed to be injected in a downstream direction of the conveying line, i.e., towards the outlet of the conveying line, in substantially parallel relation to the longitudinal axis of the passageway that is defined in the conveying line and thus so as to be substantially adjacent to the area of the inner surface of the conveying line that is located in proximate relation to that orifice. Preferably, the plurality of orifices are suitably disposed so as to be equally spaced one from another about the circumference of the inner surface of the conveying line. That is, to this end, if one were to look at a cross section that is taken normal to the longitudinal axis of the passageway that is defined in the conveying line at the orifices, each of the plurality of orifices would then appear to be equally spaced around the circumference of the passageway that is defined in the conveying line.

Continuing, it is particularly preferred that in accordance with the present invention the system also include an air nozzle that is provided with a slot from which air is capable of being suitably injected into the passageway that is defined in the conveying line. Said slot is positioned so as to be suitably disposed between the plurality of orifices and the outlet of the conveying line, i.e., at a point that is located at a distance from the plurality of orifices in the direction of the outlet of the conveying line. Preferably, said slot extends around the entire circumference of the inner surface of the conveying line. That is, to this end, if one were to view a cross section taken normal to the longitudinal axis of the passageway that is defined in the conveying line, it would be seen that a continuous slot is thus formed around the entire circumference of the inner surface of the conveying line. Continuing, the air nozzle is designed to be operative to assist in avoiding the deposit of material from the solution that is injected for aqueous treatment purposes forming on the inner surface of the conveying line and/or to aid as well in the coating of the sorbent particles with the solution that is injected for aqueous treatment purposes. In accordance with the preferred embodiment of the present invention, the primary air nozzle slot is advantageously configured so as to be operative for purposes of effecting therewith the injection of air into the passageway, which is defined in the conveying line, in a manner such as to be substantially flush with the inner surface of the conveying line. To this end, the primary air nozzle slot is suitably formed such that the air is injected therethrough in a downstream direction, i.e., in a direction towards the outlet of the conveying line, in substantially parallel relation to the longitudinal axis of the passageway that is defined in the conveying line, and thus so as to be substantially adjacent to the surface area of the inner surface of the conveying line, e.g., the pipe, that is located in proximate relation to the primary air nozzle slot. By virtue of directing the injected air in such a manner, a curtain of air is thus caused to be formed along the inner surface of the conveying line.

In accordance with the preferred embodiment of the present invention, the system also includes another air nozzle, the latter having a slot formed therein from which air is injected into the passageway that is defined in the conveying line. This other air nozzle is suitably disposed between the air nozzle slot, which has been described previously above, and the outlet of the conveying line, i.e., at a distance from the air nozzle slot, which has been described above, in the direction of the outlet of the conveying line, and about the entire circumference of the inner surface of the conveying line, e.g., the pipe. This other air nozzle is designed to be operative to assist in avoiding the deposition of material from the solution, which is injected for aqueous treatment purposes, forming on the inner surface of the conveying line. This other air nozzle slot is also designed to be advantageously configured so as to be operative to inject air into the passageway that is defined in the conveying line in a manner such as to be substantially flush with the inner surface of the conveying line. That is, to this end, said slot is suitably formed such that the air is injected in a downstream direction, i.e., in a direction towards the outlet of the conveying line, in substantially parallel relation to the longitudinal axis of the passageway that is defined in the conveying line, and thus so as to be substantially adjacent to the surface area of the inner surface of the conveying line, e.g., the pipe, that is located in proximate relation to the slot in said another air nozzle. Thus, here also, by virtue of directing the injected air in such a manner, a curtain of air is thus caused to be formed along the inner surface of the conveying line.

In accordance with another preferred aspect of the present invention, the conveying line, e.g., the pipe, preferably includes a first structural component part, e.g., by way of exemplification, a first cylindrical section, having an inlet and an upstream portion of the inner surface of the conveying line, e.g., an inner cylinder wall, as well as a second structural member, e.g., a second cylindrical section, having a first intermediate portion of the inner surface of the conveying line, e.g., by way of exemplification, an inner cylinder wall, with a first portion of each of the previously described herein plurality of orifices formed therein, as well as a third structural member, e.g., by way of exemplification, a third cylindrical section, having a second intermediate portion of the inner surface of the conveying line, e.g., by way of exemplification, an inner cylinder wall, with a first portion of each of the previously described herein plurality of orifices formed therein, and a fourth structural component part, e.g., by way of exemplification, a fourth cylindrical section, having an outlet and a downstream portion of the inner surface of the conveying line, e.g., by way of exemplification, an inner cylinder wall. The second structural member is designed to be attached to the first and the third structural members, while the fourth structural member is designed to be attached to the third structural member such as to thereby form the conveying line as well as the plurality of orifices thereof.

In accordance with the preferred embodiment of the present invention the solution that is employed for aqueous treatment purposes preferably, by way of exemplification, consists of an aqueous sodium solution that includes a surfactant. To this end, if the sorbent particles are limestone particles, said surfactant preferably includes a concentration by weight of 0.01% to 2.0% of one or a mixture of more than one of the group selected from octylphenoxypolyethoxyethanols, sodium alkylnaphthalenesulfonates, sodium silicates, and organic solvents.

ENABLING DESCRIPTION OF A PREFERRED EMBODIMENT

The Conveying Line

Figure 1:
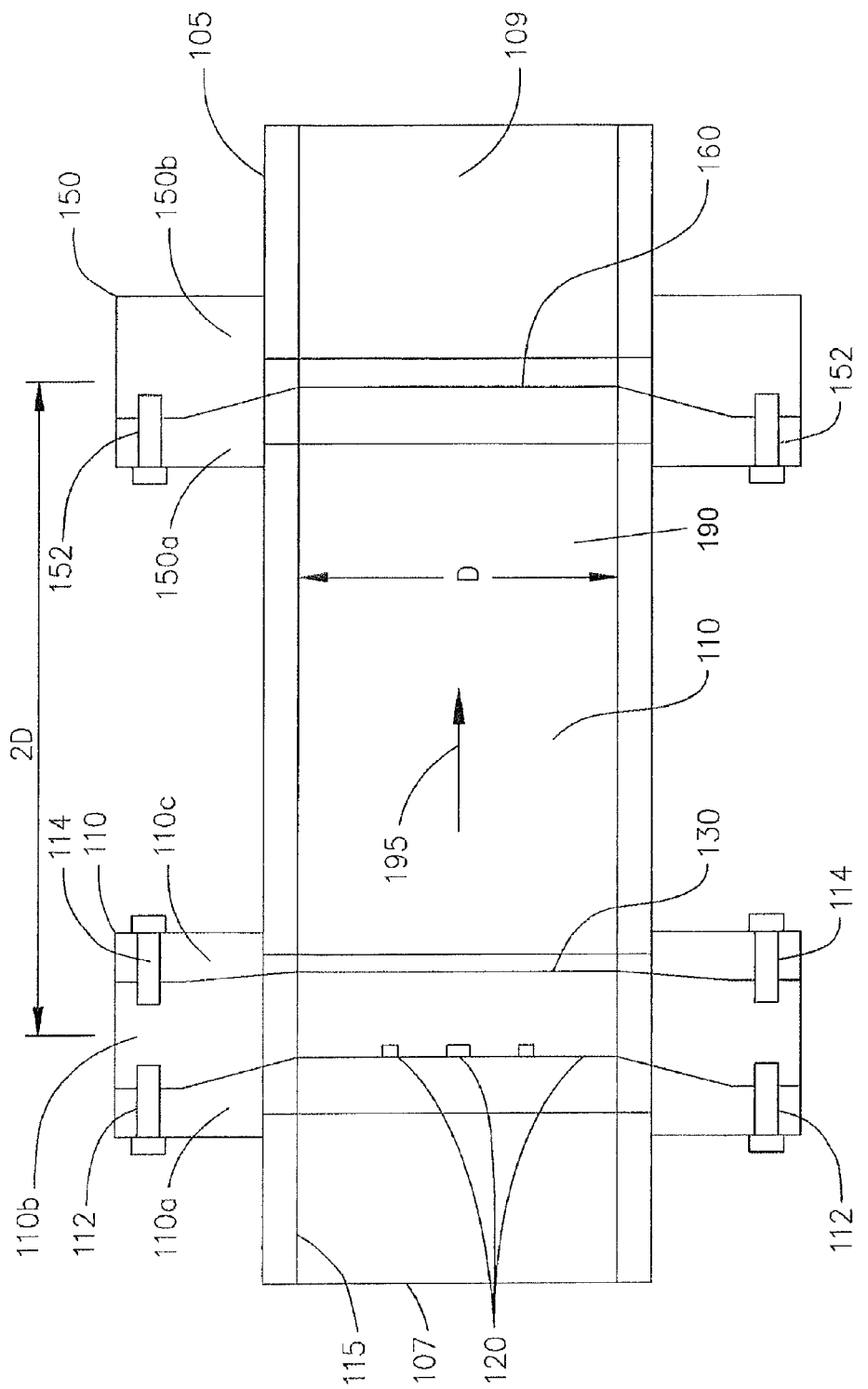
FIG. 1 illustrates a preferred embodiment constructed in accordance with the present invention.

As illustrated in FIG. 1 of the drawings, in accordance with the present invention a pneumatic transport pipe 105 is operative as a passageway 190 for purposes of effecting therewith the conveyance of pulverized limestone from a suitable storage supply thereof to a circulating fluidized bed boiler. As will be readily apparent to those skilled in this art, pulverized limestone is commonly employed as a sorbent in circulating fluidized bed boilers. To this end, the pulverized limestone particles are conveyed for this purpose by means of pressurized air in a direction denoted as 195 in FIG. 1 from a pneumatic transport pipe inlet 107 to a pneumatic transport pipe outlet 109. The pneumatic transport piping, by way of exemplification and not limitation, may, for example, have a diameter denoted as D in FIG. 1 of 4 to 4.5 inches, although other pipe sizes may be utilized if so desired without departing from the essence of the present invention. Continuing, the inner surface 105(a) of the pneumatic transport pipe is defined by the passageway 190 through which the pulverized limestone particles are made to flow.

With further reference to FIG. 1, as illustrated therein there are preferably provided two injector subassemblies 110 and 150 that effectively define respective portions of the pneumatic transport pipe 105. To this end, injector subassembly 110, as illustrated in FIG. 1 is comprised of three structural components denoted as 110(a), 110(b), and 110(c) in FIG. 1. These three structural components 110(a), 110(b), and 110(c) are suitably attached by means of the bolts 112 and 114, so as to thereby comprise the complete injector subassembly 110. When the structural components 110(a), 110(b), and 110(c) are fully assembled, the structural components 110(a), 110(b), and 110(c) are suitably interleaved such that the components 110(a) and 110(b) are operative to form a series of radial positioned orifices 120 that are suitably spaced one from another around the inner circumference of the pneumatic transport pipe 105. The orifices 120 in turn are suitably configured so as to be operative for purposes of effecting therewith the injection of a liquid sorbent conditioner into the passageway 190. More particularly, in accordance with the present invention each such orifice 120 is suitably configured so as to be operative to inject the liquid sorbent conditioner therefrom in a spray pattern that diverges from the respective one of the orifices 120. In accordance with the preferred embodiment of the present invention, the orifices 120 are designed to be radially positioned about the periphery of the inner surface 115 of the transport pipe 105, such that the spray that is injected through the orifices 120 is directed inward towards the limestone particles that are flowing through the passageway 190 in the direction that is denoted as 195 in FIG. 1. Continuing, the orifices 120 in accordance with the present invention are preferably equally spaced around the circumference that is defined by the inner surface 115 of the pneumatic transport pipe 105.

By virtue of the interleaving thereof the subassembly components 110(b) and 110(c) effectively form a continuous slot 130, which extends around the inner circumference of the transport pipe 105 at a point that is located immediately downstream of the orifices 120. To this end, the continuous slot 130 is designed to be operative for purposes of injecting pressurized air therethrough into the passageway 190 in order to thereby prevent errant droplets of the liquid sorbent conditioner and errant particles of the sorbent from reaching the inner surface 115 of the pneumatic transport pipe 105.

Continuing, the injector subassembly 150 includes the two structural components 150(a) and 150(b), which are suitably attached by means of the bolts 152 so as to thereby comprise the complete injector subassembly 150. As best understood with reference to FIG. 1, the injector subassembly 150 also comprises a portion of the pneumatic transport pipe 105. When the two structural components 150(a) and 150(b) are fully assembled, the interleaving of the structural component 150(a) with the structural component 150(b) is operative to create a continuous slot 160 about the circumference of the inner surface 115 of the pneumatic transport pipe 105. In accordance with the preferred embodiment of the present invention, the slot 160 is preferably located a distance equal to two pipe diameters, i.e., 2D, downstream of the orifices 120 through which the aqueous sorbent conditioner is injected into the passageway 190. Pressurized air is injected through the aforedescribed slot 160 into the passageway 190 in order to thereby further prevent errant droplets of the aqueous sorbent conditioner as well as particles of treated limestone from reaching the inner surface 115 of the pneumatic transport pipe 105. The pressurized air that is injected through the slot 160 is also operative to effect the mid-stream residence time during which contact of the droplets of the aqueous sorbent conditioner and the particles of treated limestone with the inner surface 115 of the pneumatic transport pipe 105 is prevented thereby facilitating a better dispersion of the aqueous sorbent conditioner in the flow of the sorbent particles. Because the pressurized air, which is injected through the slot 160, is deemed to be secondary to the pressurized air that is injected through the slot 130, the slot 160 is frequently referred to as a secondary air slot, whereas the slot 130 is frequently referred to as the injecting primary air slot.

The Primary Injector Subassembly

Figure 2:
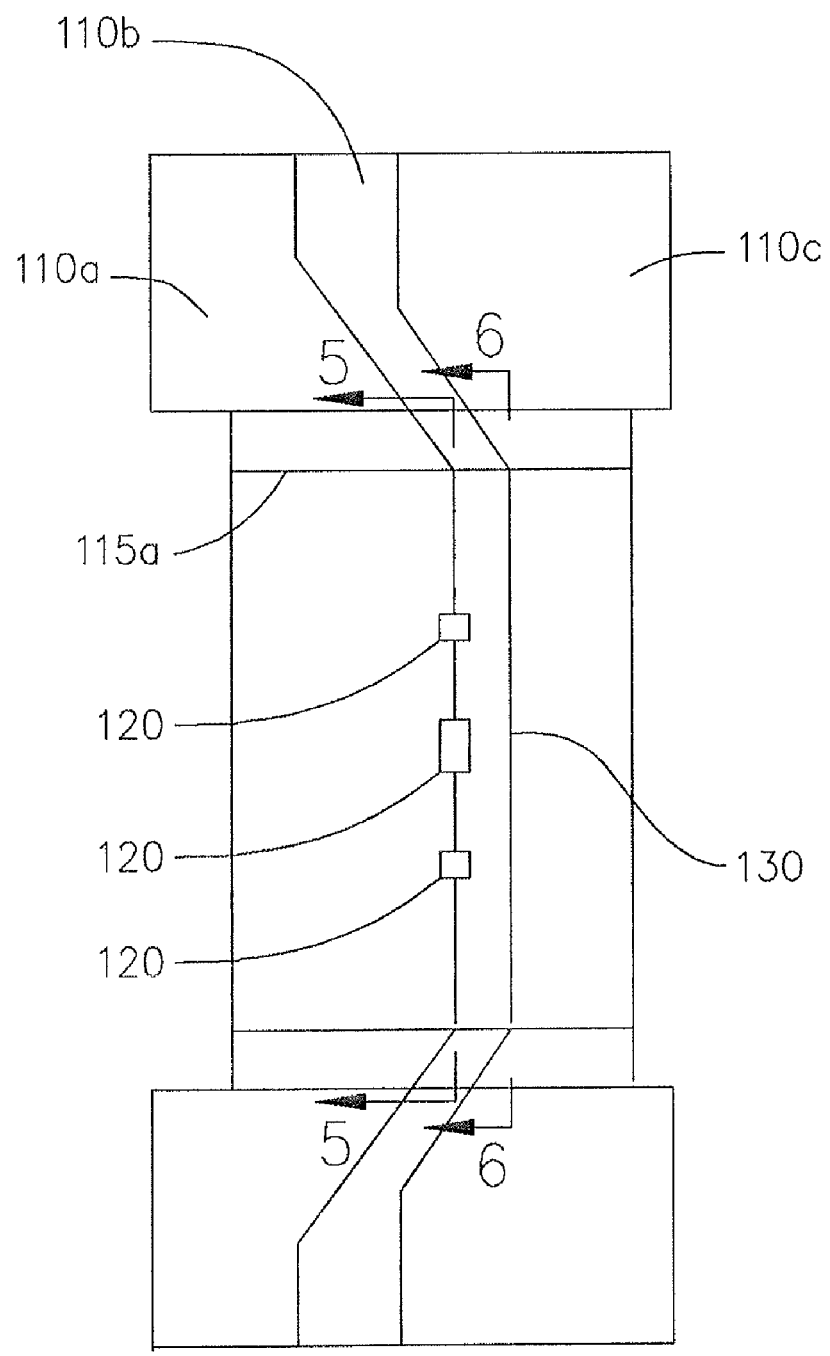
FIG. 2 is an enlarged view of the primary injector assembly of the preferred embodiment illustrated in FIG. 1 constructed in accordance with the present invention.

In FIG. 2 of the drawings, there is illustrated an enlarged view of the primary injector assembly 110, which is illustrated in FIG. 1 and to which reference has been had hereinbefore previously. The bolts 112 and 114, which are shown in FIG. 1, are not shown in FIG. 2 in the interest of maintaining clarity of illustration in the drawings in order to avoid the illustration therein of unnecessary details. As best understood with reference to FIG. 2, the primary injector subassembly 110, constitutes the inner surface section 115(a) of the inner surface 115, the latter serving to define the circumference of the passageway 190.

Figure 4:
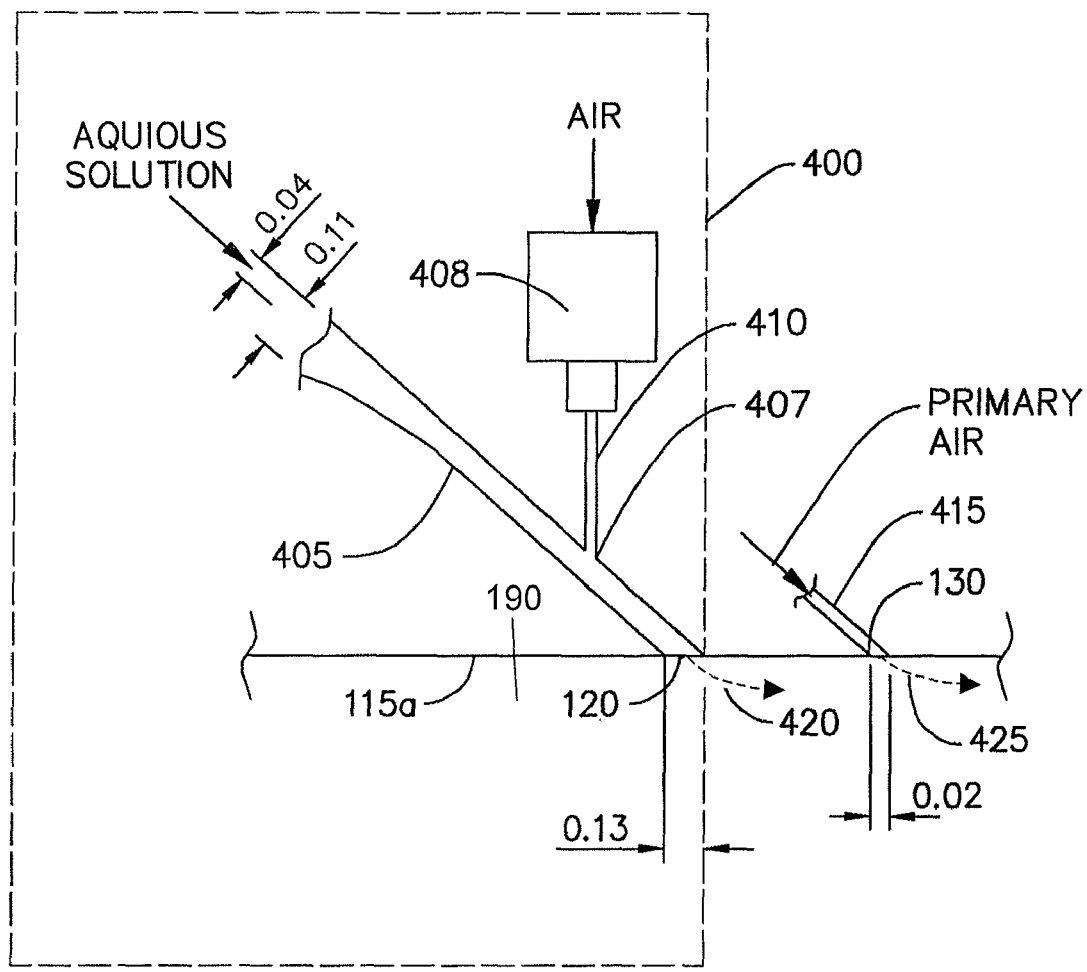
FIG. 4 is a detailed view of the primary injector assembly nozzles of the preferred embodiment illustrated in FIG. 2 constructed in accordance with the present invention that are operative for purposes of effecting therewith the injection of an aqueous treatment solution and primary air.

With reference next to FIG. 4 of the drawings, as best understood with reference thereto each of the orifices 120 is operative to form the outlet of a respective one of the annular nozzles 400 through which the aqueous solution of liquid sorbent conditioner is provided to the passageway 190. In accordance with the preferred embodiment of the invention, the nozzle 400 through which the aqueous solution of the sorbent conditioner is provided to the passageway 190, preferably consists of both a compound atomizer nozzle that includes a needle-like port for introduction therethrough of the liquid sorbent conditioner, as the latter, preferably by way of exemplification, consisting of a solution of sodium hydroxide, and a conditioner jet 405 that is made to penetrate an air stream that in turn is directed from the air jet 410 at the throat 407 of said compound nozzle. Said penetration of said air stream by the aqueous solution of the liquid sorbent conditioner at the throat 407 must be such as to thereby cause the aqueous solution of the liquid sorbent conditioner to be subjected to a high shear so as to thereby cause an atomization of the aqueous conditioner to occur.

Such compound nozzles that are suitable for use for purposes of effecting therewith the atomization of liquids are well known to those skilled in the power industry, and accordingly, it is not deemed to be necessary to discuss them any further herein, other than to take note of the fact that a manifold 408 is preferably provided that functions to effect a distribution of the pressurized air flow to the jet 410 of each respective one of the compound nozzles. However, a unique aspect of the compound nozzles that are preferably employed in accordance with the present invention is that such compound nozzles in accordance with the present invention are preferably formed by the intersection of the two different structural components 110(a) and 110(b) of the injector subassembly 110, such as to thereby provide multiple individual compound nozzles having orifices that are radially located about the inner surface 115(a) of the pneumatic transport pipe 105 as well as conditioner jets 405 that are suitably positioned at a desired angle with regard to the field of flow of the transported sorbent particles. As best understood with reference to FIG. 4, the jets 405 in accordance with the preferred embodiment of the present invention are preferably located at approximately a 45° angle to the longitudinal axis of the pneumatic transport pipe 105.

Continuing, with further reference to FIG. 4, a primary air jet 415 is preferably formed in accordance with the present invention by the intersection of the structural components 110(b) and 110(c) of the injector subassembly 110, so as to be operative to direct primary air to the slot 130, the latter also being formed by the intersection of the structural components 110(b) and 110(c) of the injector subassembly 110. In accordance with the preferred embodiment of the present invention, the angle of the jet 415 is preferably designed to be at approximately the same angle as that the angle of the jet 405.

The dashed lines 420 and 425 in FIG. 4 that extend from the orifice 120 and the primary air slot 130, respectively, illustrate the direction of flow of the atomized aqueous conditioner from each of the orifices 120 and the primary air from the slot 130, respectively, into the passageway 190. Note should be taken of the fact that the primary air from the slot 130 is designed to be directed so as to be substantially flush to the inner surface 115(a) of the pneumatic transport pipe 105, and so as to form a curtain of primary air, which is intended to function to prevent both the aqueous solution of the liquid sorbent conditioner and the damp pulverized limestone particles from contacting the inner surface 115 of the pneumatic transport pipe 105.

Figure 5:
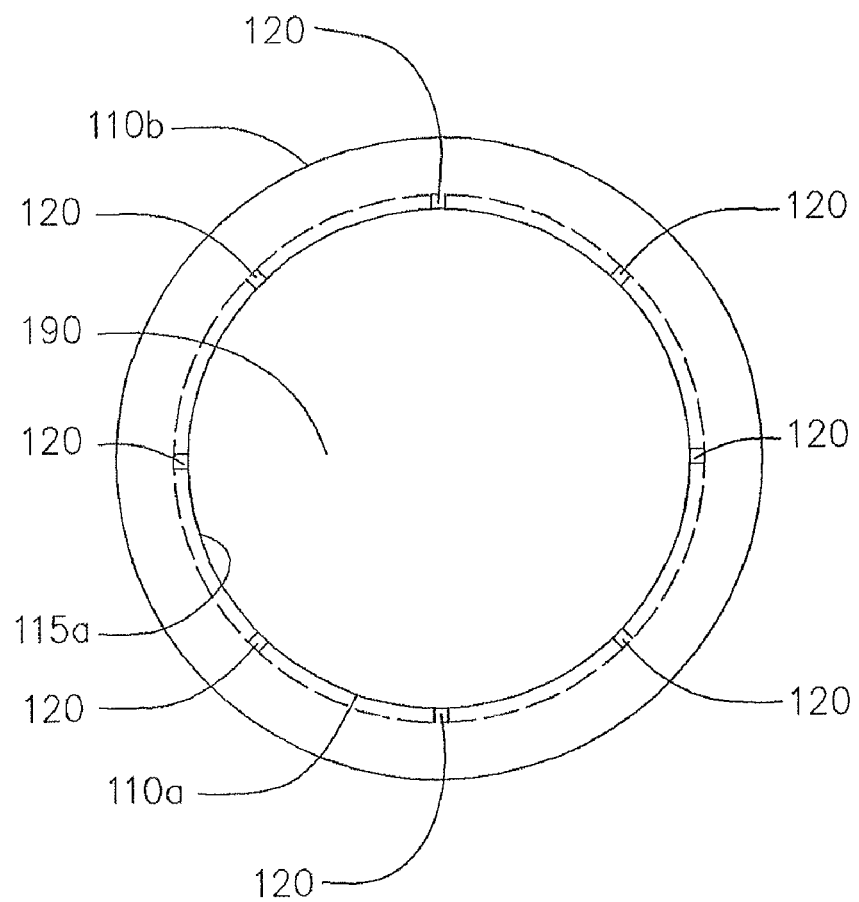
FIG. 5 is a cross-sectional view of the conveying line of the preferred embodiment constructed in accordance with the present invention taken substantially at the location of the aqueous treatment solution injection orifices of the primary injector assembly of the preferred embodiment illustrated in FIG. 2.

In FIG. 5 there is depicted a cross-sectional view taken along the line that is denoted as 5-5 in FIG. 2 through the radially spaced orifices 120. As best understood with reference to FIG. 5, each of the orifices 120 is formed by virtue of the intersection of the structural components 110(a) and 110(b) of the injector subassembly 110. To this end, the structural component 110(a) defines the inner surface 115(a) in this cross-sectional view that is illustrated on FIG. 5. With further reference to FIG. 5, as illustrated therein the orifices 120 are preferably located one from another so as to be equally spaced around the circumference of the inner surface 115(a) of the pneumatic transport pipe 105. It should be understood that while a cylindrical pneumatic transport pipe 105 has been illustrated in the drawings such is not mandatory and other geometries could equally well be utilized without departing from the essence of the present invention. Hence, while in accordance with the preferred embodiment of the present invention that is depicted in the drawings, the orifices 120 are shown to be spaced equally from one another both in terms of distance along the inner circumference of the pneumatic transport pipe 105 and at a radial angle about the longitudinal axis of the passageway 190, this would not necessarily be the case if without departing from the essence of the present invention a different geometry, e.g., by way of exemplification and not limitation, a rectangular geometry, is employed for purposes of defining the passageway 190. While there are eight orifices illustrated in FIG. 5, it should be understood that more or less orifices 120, and hence more or less aqueous conditioner nozzles (400 of FIG. 4) could equally well be employed without departing from the essence of the present invention. For example, by way of exemplification and not limitation, it may be preferable for purposes of some applications to employ six orifices rather than the eight orifices, which are illustrated in FIG. 5.

Figure 6:
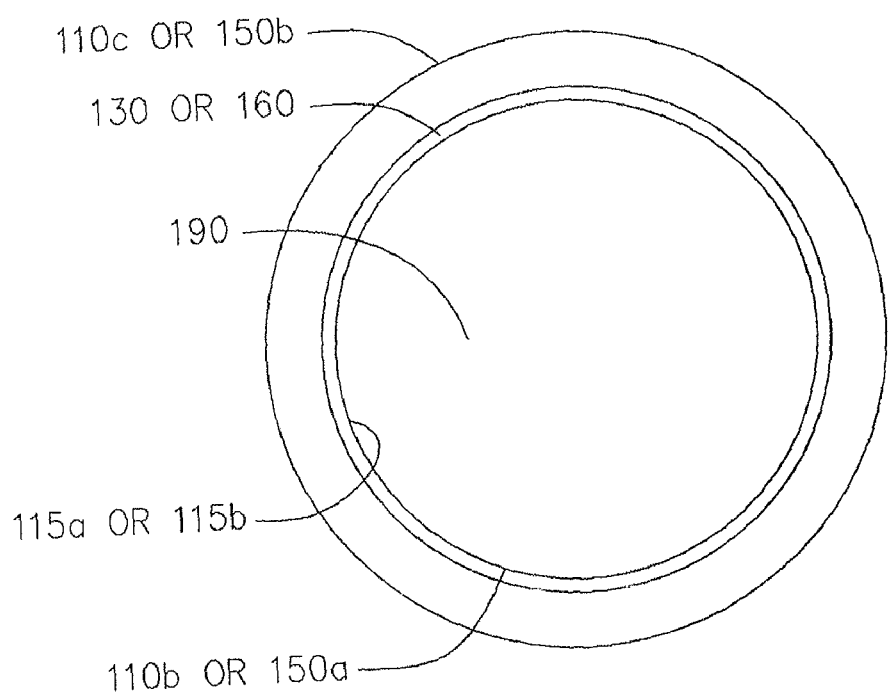
FIG. 6 is a cross-sectional view of the conveying line of the preferred embodiment constructed in accordance with the present invention taken at the primary air injection slot of the primary injector assembly of the preferred embodiment illustrated in FIG. 2 or taken at the location of the secondary air injection slot of the secondary injector assembly of the preferred embodiment illustrated in FIG. 3.

In FIG. 6 there is depicted a cross-sectional view taken through the slot 130 taken along the line that is denoted as 6-6 in FIG. 2. As best understood with reference to FIG. 6, a continuous annular slot 130 is formed by virtue of the intersection of the structural components 110(b) and 110(c) of the injector subassembly 110. To this end, with further reference to FIG. 6, the inner surface 115(a) of the pneumatic transport pipe 105 is defined in the cross-sectional view that is illustrated in FIG. 6 by the structural component 110(b).

With reference again to FIG. 4 of the drawings, each of the compound atomizer nozzles and the primary air nozzle are preferably formed by virtue of the machining of the respective structural components of the injector subassembly 110. To this end, preferably each of the passageways 405 and 410 is suitably machined such that the air jet 410 is made to intersect the narrow throat region 407, so as to thereby give rise to an aspiration of the aqueous solution of the liquid sorbent conditioner. Continuing, in accordance with the present invention the air is preferably supplied at the entrance of each of the passageways 405 and 410 via a circumferential manifold 408.

As will be best understood from a reference to FIG. 4, the aqueous solution of the liquid sorbent conditioner is preferably introduced into the passageway 405, such as to thereby avoid any protrusion thereof into the passageway 190, which might have the effect of subjecting the latter to rapid wear. Furthermore, by virtue of the directing of the primary air in such a manner so as to be substantially flush to the inner surface 115(a) of the pneumatic transport pipe 105, it is thereby possible to take advantage of the fact that the transport velocity of the pulverized limestone particles is near zero at the inner surface 115 of the pneumatic transport pipe 105. This quiescent zone where the transport velocity of the pulverized limestone particles is near zero is also used for purposes of introducing thereat an atomized spray of the aqueous solution of the liquid sorbent conditioner to the passing pulverized limestone particles.

The Secondary Injector Subassembly

Figure 3:
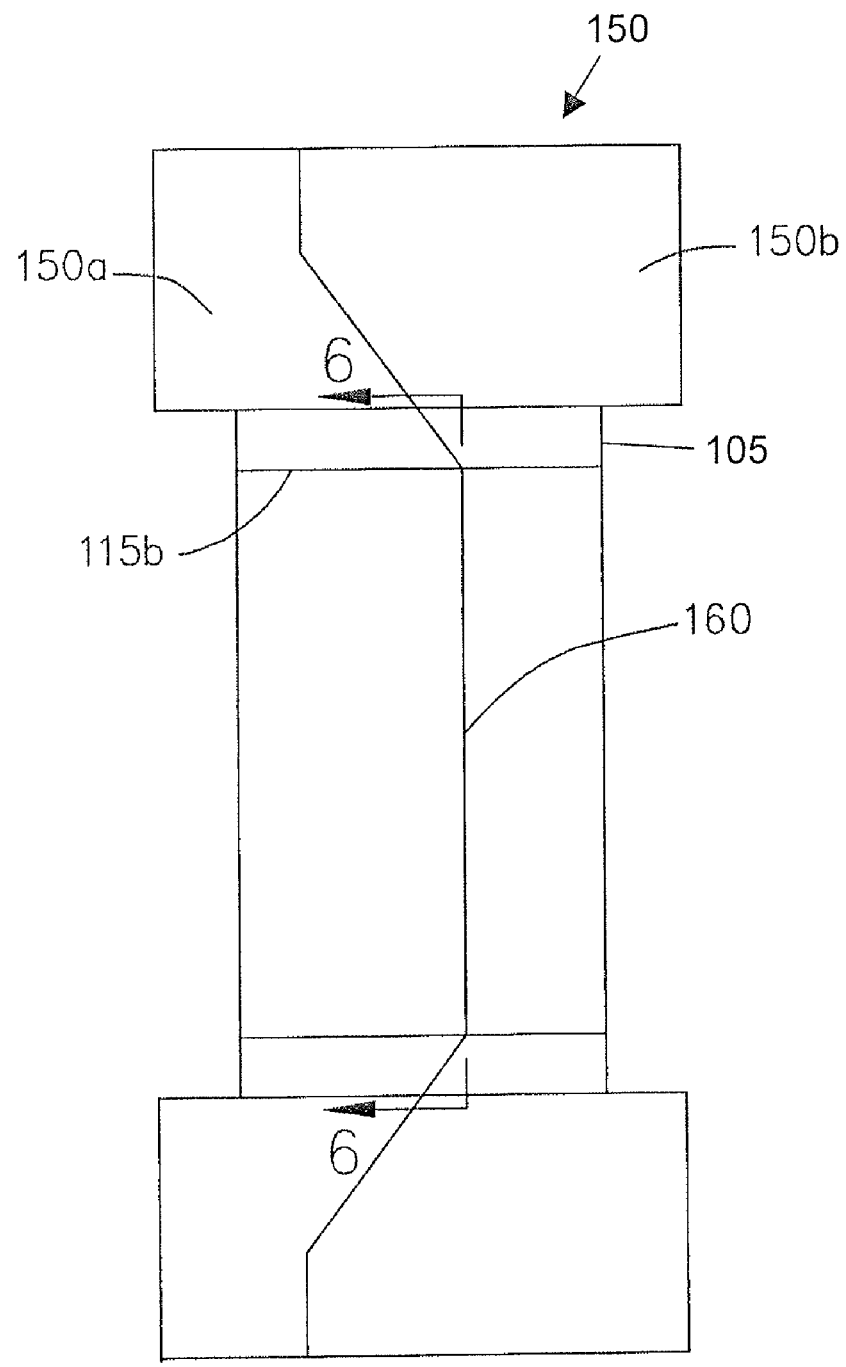
FIG. 3 is an enlarged view of the secondary injector assembly of the preferred embodiment illustrated in FIG. 1 constructed in accordance with the present invention.

In FIG. 3 there is depicted an enlarged view of the secondary injector subassembly 150 that is illustrated in FIG. 1. The bolts 152 are not shown in FIG. 3 in the interest of maintaining clarity of illustration in the drawings and so as to thereby avoid the need to illustrate unnecessary details in FIG. 3. As best understood with reference to FIG. 3, the secondary injector assembly 150 as illustrated therein is operative to define the inner surface 115(b) of the pneumatic transport pipe 105. The cross-sectional view that is taken through the slot 160 along the line that is denoted as 6-6 in FIG. 3 is also illustrated in FIG. 6.

As best understood with reference to FIG. 6, the continuous annular slot 160 is formed by virtue of the intersection of the structural components 150(a) and 150(b). Continuing, a primary air jet that is substantially similar to the primary air jet 415, which is illustrated in FIG. 4, is also formed in accordance with the present invention by virtue of the intersection of the structural components 150(a) and 150(b). As will be apparent from a reference to FIG. 6, inner surface 115(b) of the pneumatic transport pipe 105 is formed by the structural component 150(a) at the location therewith of the cross-section through the continuous annular slot 160. With further reference thereto, the continuous annular slot 160 is designed to be operative to direct a flow of secondary air such that the latter is made to be substantially flush with the inner surface 115(b) of the pneumatic transport pipe 105 and so as to be directed in the direction of flow, which is denoted as 195 in the drawings, of the pulverized limestone particles that are being conveyed through the passageway 190 of the pneumatic transport pipe 105. By virtue of this a curtain of secondary air is provided that is designed to be operative for purposes of controlling the midstream residence time during which the pulverized limestone particles and the atomized droplets of the aqueous solution of the liquid sorbent conditioner are prevented from making contact with the inner surface 115 of the pneumatic transport pipe 105. In turn this results in the atomized droplets of the aqueous solution of the liquid sorbent conditioner being better dispersed within the field of flow of the pulverized limestone particles, and thus effectively enhances the probability of the limestone particles being wetted and of an ultimate dry surface coating being provided by the aqueous solution of the liquid sorbent conditioner.

Operation

In accordance with the mode of operation of the present invention, the pulverized limestone particles are caused to be transported in the direction denoted as 195 in the drawings through the passageway 190 at a pneumatic transport velocity, which typically is in the range of 60-100 feet per second. Continuing, in accordance with the present invention the weight fraction ratio of air to limestone solids may be as high as 1:1 and as low as 1:10. A typical operating condition when employing the present invention is that about 2,800 pounds of air per hour are preferably used for purposes of transporting about 12,000 pounds of limestone per hour. Although under such an operating condition, the mass transport ratio of air to solids is about 1:4, and the volume fraction of air to solids is about 220:1. For instance, by way of exemplification and not limitation, 43,000 cubic feet of air may be employed for purposes of affecting the transport of approximately 200 cubic feet of dry pulverized limestone particles. Because of the existence of such a relatively low volume fraction, small atomized droplets of the aqueous solution of the liquid sorbent conditioner must be sprayed into the stream in which the limestone is being transported in such a way that there exists a high probability that there will occur a collision between the limestone particles and the atomized droplets of the aqueous solution of the liquid sorbent conditioner. Furthermore, in accordance with the present invention it is necessary that the wetted limestone particles be retained in the high velocity transport stream, without any of the wetted limestone particles making contact with the inner surface 115 of the pneumatic transport pipe 105, until at least such time as the limestone particles have become coated by the aqueous solution of the liquid sorbent conditioner and until such time as sufficient moisture has been vaporized. Continuing, once the limestone particles are nearly dry, the risk of any deposits being formed on the inner surface 115 of the pneumatic transport pipe 105 is greatly reduced.

With further reference to the mode of operation of the present invention, in accordance therewith the air pressure at the point of entry 107 of the passageway 190 is typically about 4 pounds per square inch (psi), and the temperature within the passageway 190 at the entry point 107 is generally in the range of 850 to 140° Fahrenheit. Continuing, the amount of aqueous solution of the liquid sorbent conditioner, e.g., by way of exemplification, a 15 to 40% concentration of sodium hydroxide in water, is preferably applied at a rate that is within the range of approximately 15 to 30 gallons per hour. To this end, the primary injector subassembly 110 is preferably supplied with the aqueous solution of the liquid sorbent conditioner from a day tank (not shown in the interest of maintaining clarity of illustration in the drawings) that is capable of holding a 50% caustic solution, which in turn is designed to be diluted with additional water before being pumped to the primary injector subassembly 110. Continuing, the aqueous solution of the liquid sorbent conditioner is designed to be introduced to the jet 405 at a pressure of approximately 30 psi, although this pressure, without departing from the essence of the present invention, may be higher or lower depending on the flow demand dictated by the boiler with which the present invention is designed to be associated. With further reference to the mode of operation of the present invention, compressed air is introduced into the manifold 408, and from there the compressed air is introduced into the jet 410. Such compressed air may be supplied from an external compressed air supply (not shown in the interest of maintaining clarity of illustration in the drawings), which if the source of supply thereof is a boiler plant, such compressed air commonly is regulated so as to be at a pressure of about 65 psi. Continuing, compressed air from the same source and at the same pressure preferably is also supplied to the primary air jet 415, the latter being operative to supply primary air to the slot 130, as well as to the corresponding secondary air jet (not shown in the interest of maintaining clarity of illustration in the drawings), the latter secondary air jet in turn being operative to supply secondary air to the slot 160.

Addition of Surface-Active Agent

As noted in the discussion herein previously, it is well known to those skilled in the art that the addition of a surface-active agent is operative to enhance the wetting of a solid by a liquid by virtue of a reduction being effected thereby insofar as the solid-air and solid-liquid surface tensions are concerned. In accordance with a further aspect of the present invention, a surface active agent, i.e., by way of exemplification, a surfactant, is preferably added to the sodium solution that is injected through the orifices 120 into the passageway 190, in order to thereby improve the permeability and hence the flow ability of the treated pulverized limestone particles, whereby the required transport pressures are reduced.

More specifically, in accordance with the present invention a solution containing one or more of the surface active components, which are identified hereinbelow, preferably is added to a sodium containing conditioner, such as, by way of exemplification, sodium hydroxide, in order to thereby reduce the aqueous surface tension as well as to thereby improve the efficacy of effecting therewith a wetting of the surface of the dry pulverized limestone particles that are being transported through the passageway 190 of the pneumatic transport pipe 105. To this end, a single component, or multiple components comprising a surfactant add mixture, in accordance with the present invention are introduced in a concentration that consists of 0.01 to 2.0% by weight on a liquid sodium solution basis. Such a surfactant can be added at the day tank (not shown in the interest of maintaining clarity of illustration in the drawings), when the solution in the day tank is diluted, or at some other time prior to when the aqueous solution of the liquid sorbent conditioner is supplied to the jet 405. The one or more components that comprise the surfactants are in accordance with the preferred embodiment of the present invention selected from the following:

1) octylphenoxypolyethoxyethanol, such as: by way of exemplification, that which is known as TRITON X-100 surfactant;

2) sodium alkylnaphthalenesulfonates, such as, by way of exemplification, that which is known as PETRO 22 or PETRO AG both of which being provided by Witco;

3) sodium silicates; and 4) organic solvents, such as, by way of exemplification, isopropylalcohols.

By virtue of the surfactant being added to the sodium solution prior to the introduction thereof to the jet 405, the atomized aqueous solution of the liquid sorbent conditioner is thus directed into the passageway 190 via the orifices 120 thereby resulting in the pulverized limestone particles that are traveling within the passageway 190 being made to be wetted-out faster, as a consequence of which a greater amount of sodium is thus caused to be applied to the surface of the limestone particles as the limestone particles are traveling within the passageway 190. Continuing, the aqueous solution of the liquid sorbent conditioner is thus introduced into the passageway 190 so as to thereby be more uniformly dispersed onto the pulverized limestone particles that are traveling within the passageway 190.

With further reference to the mode of operation of the present invention, the addition of the surfactant is designed to be effective to result in less energy being required to transport the treated, i.e., the wetted-out, pulverized limestone particles. This will be best understood from a reference to FIG. 7, wherein there is depicted a graph in which there is illustrated the effect that the addition of the surfactant has on the transport pressure of the limestone particles. Continuing, the addition of such surfactant also results in the treated pulverized limestone particles having an enhanced sulfur capture capability. The latter will be readily apparent from a reference to FIG. 8, wherein there is depicted a graph in which there is illustrated the reactivity of limestone shown without treatment, shown with the limestone having been treated, and shown with the limestone having been treated with an aqueous solution of a liquid sorbent conditioner that includes a surfactant. The enhanced sulfur capture capability achievable through the use of a surfactant in turn results in a reduction being had in the required Ca/S ratio as well as in the total amount of ash produced when the present invention is being utilized in association with a boiler.

Figure 7:
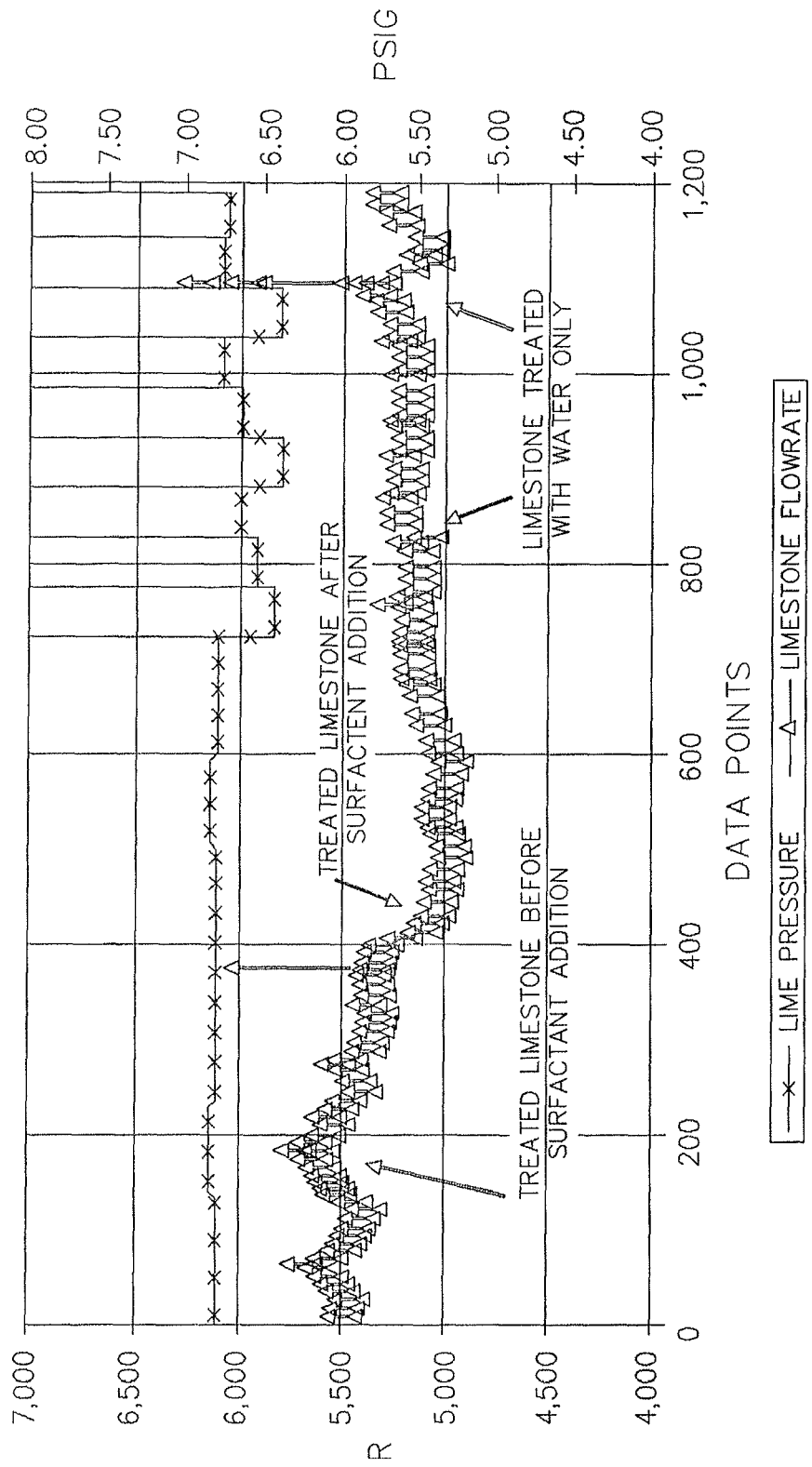
FIG. 7 is a graphical illustration of the effect in accordance with the present invention of a surfactant addition on the transport pressure.

The test results that are shown in FIG. 7, indicate that the addition of water has the effect of decreasing the permeability of the pulverized limestone particles that are being conveyed through the pneumatic transport pipe 105, thereby resulting in an increase occurring in the pressure drop within the passageway 190. This effect, i.e., such an increase in the pressure drop, is actually exacerbated when the limestone is treated with a sodium containing solution. As a consequence thereof, the total amount of sodium that can be practically introduced into the passageway 190 is limited.

TABLE 1

Effect of Surfactants on Sodium Hydroxide Solutions

| Solution | Approximate Surface Tension (dynes/cm) |
|---|---|
| Water | 73 |
| 25% NaOH in Water | 90 |
| 15% Na2CO3 in Water | 75 |
| 0.1% TRITON X-100 in 25% NaOH | 41 |
| 1% 2-propanol in 25% NaOH | 36 |
| 0.5% Sodium metasilicate in 25% NaOH | 36 |

Figure 8:
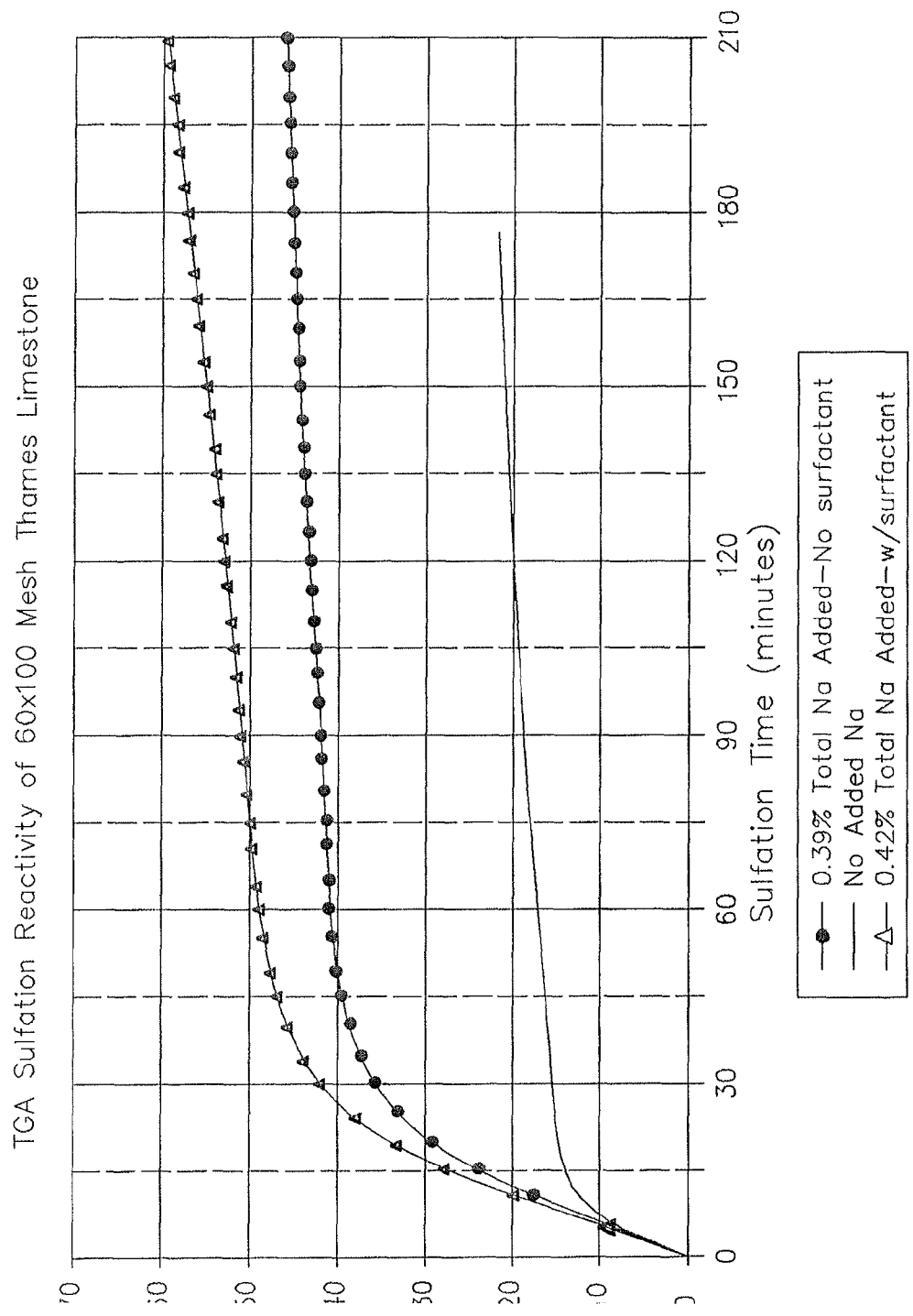
FIG. 8 is a graphical illustration of the effect in accordance with the present invention of sulfation reactivity with limestone.
Figure 9:
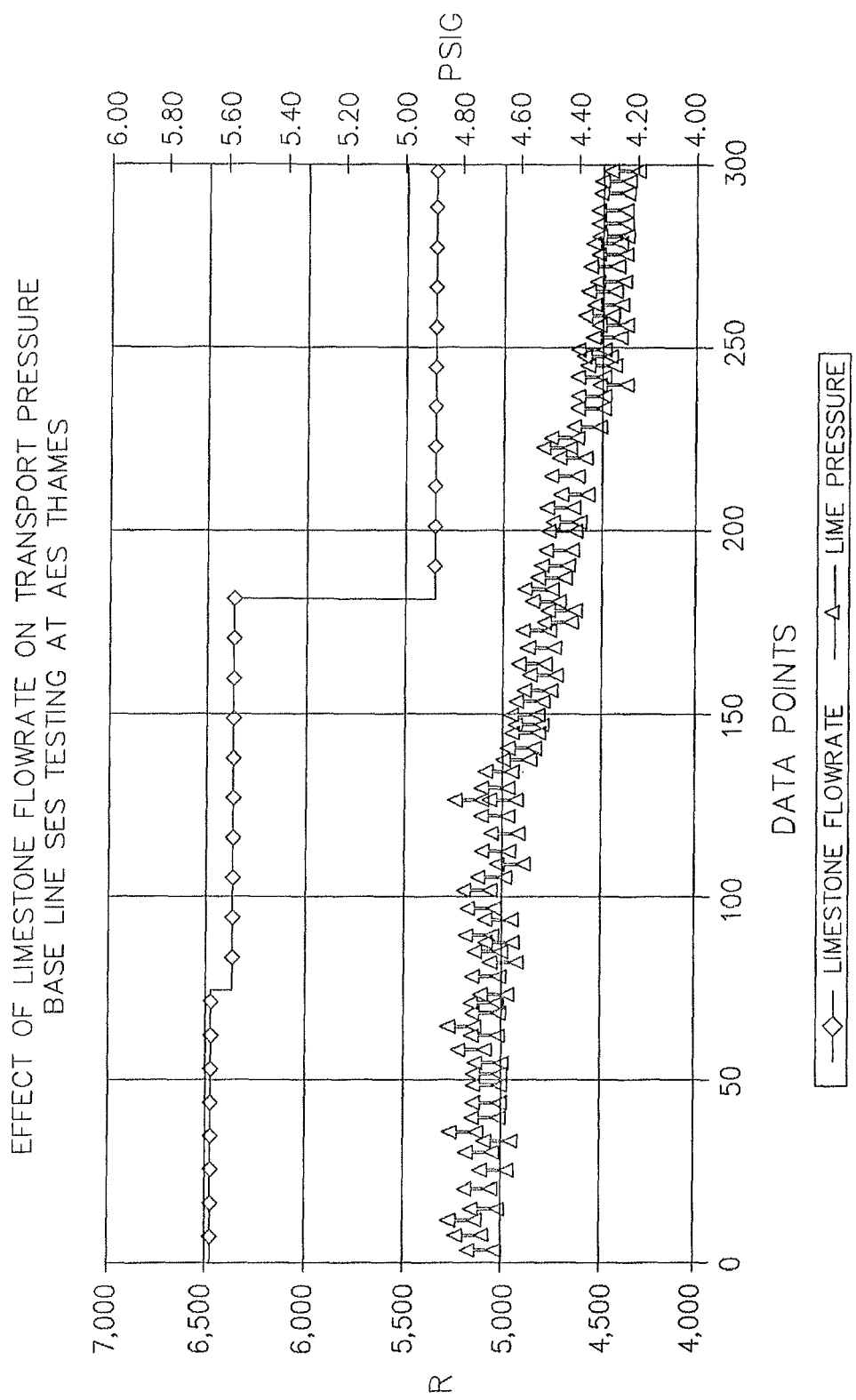
FIG. 9 is a graphical illustration of the effect in accordance with the present invention of limestone flow rate on the transport pressure.

As will be best understood from a reference to Table 1 above, solutions that contain sodium hydroxide and surfactants, other than water, have higher surface tensions than do such solutions and water alone. The addition of one of the surfactants that are identified above in Table 1 to the sodium solution reduces the latter sodium solution's surface tension. The effect thereof is that surface wetting is improved and also there is facilitated a quicker and more uniform covering of the sorbent particles with the aqueous solution of the liquid sorbent conditioner. Continuing, the mass transfer of the sodium constituents to the particle surfaces is increased therewith. Furthermore, as a result thereof there is a faster evaporation of water, which in turn results in the treated sorbent having improved pneumatic transport characteristics. Moreover, because of the improved surface wetting capability of the sodium aqueous solution of the liquid sorbent conditioner that includes the surfactant, it is thereby possible to apply a greater amount of sodium to the sorbent, whereby the sorbent sulfur capture capability or reactivity thereof as noted in the discussion previously hereinabove and as shown in FIG. 8 is improved.

As disclosed hereinabove previously, in accordance with the present invention an injection technique is provided that is operative for effecting therewith the injection of an aqueous solution of a liquid sorbent conditioner for treatment purposes, such as, by way of exemplification, a thermally decomposable sodium compound, into pneumatic transport piping through which h a sorbent is designed to be conveyed, such as, by way of exemplification and not limitation, limestone or dolomite, in a manner whereby the proper treatment of the sorbent particles is facilitated, and whereby at least a reduction is had in the risk of deposits of the injected materials being possibly formed on the inner wall surface of the pneumatic transport piping, as compared to when conventional techniques are employed for such a purpose. In addition, there has been disclosed herein previously an improved technique for effecting the wetting out of sorbent particles, such as, by way of exemplification and not limitation, limestone or dolomite particles, through the use of an aqueous solution of a liquid sorbent conditioner injected for treatment purposes into the pneumatic transport piping through which the sorbent is being conveyed.

While an embodiment(s) of our invention have been described herein, it will be readily appreciated that modifications thereof, some of which have been alluded to hereinabove, may still be readily made thereto by those skilled in the art without departing from the essence of the present invention. We, therefore, intend by the appended claims to cover all such modifications that have been alluded to herein as well as all other modifications that may fall within the true spirit and scope of our invention as the latter is defined in the claims appended hereto.

We claim:

1. A method for effecting the treatment of a sorbent, comprising the steps of:
    transporting sorbent particles through a passageway enclosed within a surface; and
    injecting an aqueous solution of a liquid sorbent conditioner into the passageway from a plurality of points that are located about the circumference of the surface within which the passageway is enclosed in order to effect the pretreatment of sorbent particles that are being transported through the passageway that is enclosed within the surface.

2. The method as claimed in claim 1, wherein:
    the aqueous solution of the liquid sorbent conditioner is injected for pretreatment into the passageway that is enclosed within the surface such that the aqueous solution of the liquid sorbent conditioner is made to be substantially flush to the surface in proximate relation to the location at which the aqueous solution of the liquid sorbent conditioner is injected into the passageway that is enclosed within the surface.

3. The method as claimed in claim 1, wherein:
    the locations at which the aqueous solution of the liquid sorbent conditioner is injected into the passageway that is enclosed within the surface are disposed so as to be equally spaced from one another about the circumference of the surface within which the passageway is enclosed.

4. The method as claimed in claim 1, further comprising the step of:
    atomizing the aqueous solution of the liquid sorbent solution prior to the injection of the aqueous solution of the liquid sorbent conditioner into the passageway that is enclosed within the surface.

5. The method as claimed in claim 1, further comprising the step of:
    injecting into the passageway that is enclosed within the surface about the circumference of the surface that encloses the passageway a first stream of air at a distance that is located downstream of the locations at which the aqueous solution of the liquid sorbent conditioner is injected into the passageway that is enclosed within the surface.

6. The method as claimed in claim 5, wherein:
    the first stream of air is injected into the passageway that is enclosed within the surface such that the first stream of air is made to be substantially flush to the surface within which the passageway is enclosed.

7. The method as claimed in claim 5, further comprising the step of:
    injecting into the passageway that is enclosed within the surface about the circumference of the surface that encloses the passageway a second stream of air at a distance that is located downstream of the point at which the first stream of air is injected into the passageway that is enclosed within the surface.

8. The method as claimed in claim 7, wherein:
    the second stream of air is injected into the passageway that is enclosed within the surface such that the second stream of air is made to be substantially flush to the surface within which the passageway is enclosed.

9. The method as claimed in claim 1, wherein:
    the aqueous solution of the liquid sorbent conditioner that is being injected for pretreatment purposes is an aqueous sodium solution that includes a surfactant.

10. The method as claimed in claim 9, wherein:

the sorbent particles are limestone particles; and the surfactant includes a concentration by weight of 0.01% to 2.0% of one or a mixture of more than one selected from the group consisting of octylphenoxypolyethoxyethanol, sodium alkylnaphthalenesulfonates, sodium silicates, and organic solvents.

* * * * *